(12) United States Patent
Kolli et al.

(10) Patent No.: US 7,409,561 B1
(45) Date of Patent: Aug. 5, 2008

(54) PIRACY PROTECTION FOR COMBINED HARDWARE/SOFTWARE PRODUCTS

(75) Inventors: Neela Syam Kolli, Lawrenceville, GA (US); Ajitabh Prakash Saxena, Norcross, GA (US); Krishna Kishore Lingamsetty, Lilburn, GA (US)

(73) Assignee: LSI Corporation, Milpitas, CA (US)

( * ) Notice: Subject to any disclaimer, the term of this patent is extended or adjusted under 35 U.S.C. 154(b) by 804 days.

(21) Appl. No.: 10/709,967

(22) Filed: Jun. 9, 2004

(51) Int. Cl.
*G06F 9/00* (2006.01)
*G06F 11/30* (2006.01)

(52) U.S. Cl. ............................... 713/193; 713/1; 713/2

(58) Field of Classification Search ................. 713/193, 713/192, 189, 1, 2
See application file for complete search history.

(56) References Cited

FOREIGN PATENT DOCUMENTS

WO    WO0173567 A1 * 10/2001

OTHER PUBLICATIONS http://en.wikipedia.org/wiki/RAID, year 2007.*

Hardware and software symbiosis helps smart card evolution Dhem, J.-F.; Feyt, N.; Micro, IEEE vol. 21, Issue 6, Nov.-Dec. 2001 pp. 14-25.*
Enhancing PC Security with a U-Key Peng Shaunghe; Han Zhen; Security & Privacy, IEEE vol. 4, Issue 5, Sep.-Oct. 2006 pp. 34-39.*
Malicious code detection for open firmware Adelstein, F.; Stillerman, M.; Kozen, D.; Computer Security Applications Conference, 2002. Proceedings. 18th Annual Dec. 9-13, 2002 pp. 403-412.*

* cited by examiner

*Primary Examiner*—David Y Jung
(74) *Attorney, Agent, or Firm*—Law Office of Michael R. Nichols

(57) ABSTRACT

An apparatus, computer program product, and method for preventing piracy in combined hardware/software products, and specifically in RAID storage systems is disclosed. In a preferred embodiment of the present invention, when a hardware device (a disk controller, in a preferred embodiment) is initialized, the device executes firmware that directs it to write a signature to a storage location (scratchpad register) in the device, where the signature corresponds to a set of product features authorized for use with the hardware device. When application code executing on the host computer system attempts to access a feature (e.g., through device driver code), the stored signature is read from the hardware device. The code implementing the feature is allowed to execute only if the signature that is read from the hardware device matches a feature level of the product in which that feature is authorized.

21 Claims, 7 Drawing Sheets

PIRACY PROTECTION FOR COMBINED HARDWARE/SOFTWARE PRODUCTS

TECHNICAL FIELD

The present invention is directed generally toward a method and apparatus for preventing piracy of hardware or software features in combined hardware/software systems, and more specifically, in Redundant Arrays of Inexpensive Disks (RAIDs).

BACKGROUND ART

The concept of RAID ("Redundant Arrays of Inexpensive Disks," now commonly referred to in the literature as "Redundant Arrays of Independent Disks") was introduced in PATTERSON, David. A Case for Redundant Arrays of Inexpensive Disks (RAID). *Proc. ACM SIGMOD Conference*, 1988 p. 109-116. The basic concept of RAID was to replace a "Single Large Expensive Disk" (SLED), such as was commonly used in mainframe computers, with an array of smaller, lower-end "inexpensive disks," such as are used in personal computers, in order to increase performance while keeping costs down. Whereas a SLED might be capable of accessing one sector at a time, a RAID would utilize multiple disks operating in parallel to increase overall throughput by accessing multiple sectors at one time on different disks. RAID arrays and other similar storage systems (such as RAIT—Redundant Arrays of Independent Tapes) have become a very popular and economical way to store large amounts of data in a fault-tolerant manner. RAID arrays typically employ some form of error detection or error correction scheme, such as Hamming codes, parity bits, or Reed-Solomon codes, to provide some measure of fault-tolerance, or at least fault-detection.

There are a number of different configurations of RAID arrays that are known to those skilled in the art. Most commonly, these different configurations are referred to as "RAID Levels," following the nomenclature introduced in the original Patterson paper. The different RAID levels utilize different schemes to improve the performance and reliability of the array. In a typical RAID array, which comprises inexpensive "stock" disk drives, the particular scheme employed is defined by software associated with a controller card, a host computer system, or both. In some RAID products, the user may choose from among a number of different optional configurations or features when setting up a RAID array.

It is not uncommon for software or hardware manufacturers to offer multiple versions of a single product, where the different versions offering different sets of features. For example, a word processing program may have a "standard" edition intended for home users, and a "professional" edition having additional features intended for use in a business/professional setting, such as a law office. Oftentimes a user of a product is provided the option of upgrading from one version of the software to another. In the case of a RAID array, it is also desirable for a manufacturer to be able to offer different versions of the same product, with feature sets and corresponding price ranges tailored to particular end-users.

From a technical standpoint, however, offering multiple versions of a product such as a RAID system is more complex than is the case with a simple software application. This is because a RAID system comprises both a piece of hardware and the software (including device drivers) for controlling/accessing the RAID array. It is inconvenient and uneconomical for a user to have to update/re-install both a piece of hardware and a piece of software in order to update the user's system. Moreover, it is difficult and expensive for a manufacturer to have to produce completely different versions of a product.

A more economical approach to providing multiple levels of functionality is to produce a single version of the product containing all of the features, then provide some mechanism for authorizing the user to only use certain permitted functions, such as a license file or code, which a user must have to enable certain features. This sort of scheme is often employed in software. There is a drawback to this method, however, and it is that one must have strict control over the distribution of the software and must find some way to prevent copying of the software by users in order to prevent piracy, such a requiring users to register the software with the manufacturer. These are expensive options for a manufacturer.

Moreover, in the case of device driver software, such as would be used with a RAID array, such strict control may be undesirable for additional reasons. It is a common practice among hardware vendors to release maintenance updates to device drivers over the Internet or to at least place copies of the device driver software on the Internet to allow hardware owners who may have lost their device driver software to make use of their hardware. If strict controls over the distribution of device driver software must be made, however, then the convenience of having a freely distributable device driver is lost.

Thus, it would be desirable to provide a manner of distributing a combined hardware/software product having variable feature sets, where piracy is prevented and the ability to freely distribute device driver code is maintained. The present invention provides a solution to this and other problems, and offers other advantages over previous solutions.

SUMMARY OF THE INVENTION

The present invention provides an apparatus, computer program product, and method for preventing piracy in combined hardware/software products, and specifically in RAID storage systems. In a preferred embodiment of the present invention, when a hardware device (a disk controller, in a preferred embodiment) is initialized, the device executes firmware that directs it to write a signature to a storage location (scratchpad register) in the device, where the signature corresponds to a set of product features authorized for use with the hardware device. When application code executing on the host computer system attempts to access a feature (e.g., through device driver code), the stored signature is read from the hardware device. The code implementing the feature is allowed to execute only if the signature that is read from the hardware device corresponds to a feature level of the product in which that feature is authorized.

These and various other features and advantages that characterize the present invention will be apparent upon reading of the following detailed description and review of the associated drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT(S)

Figure 1:
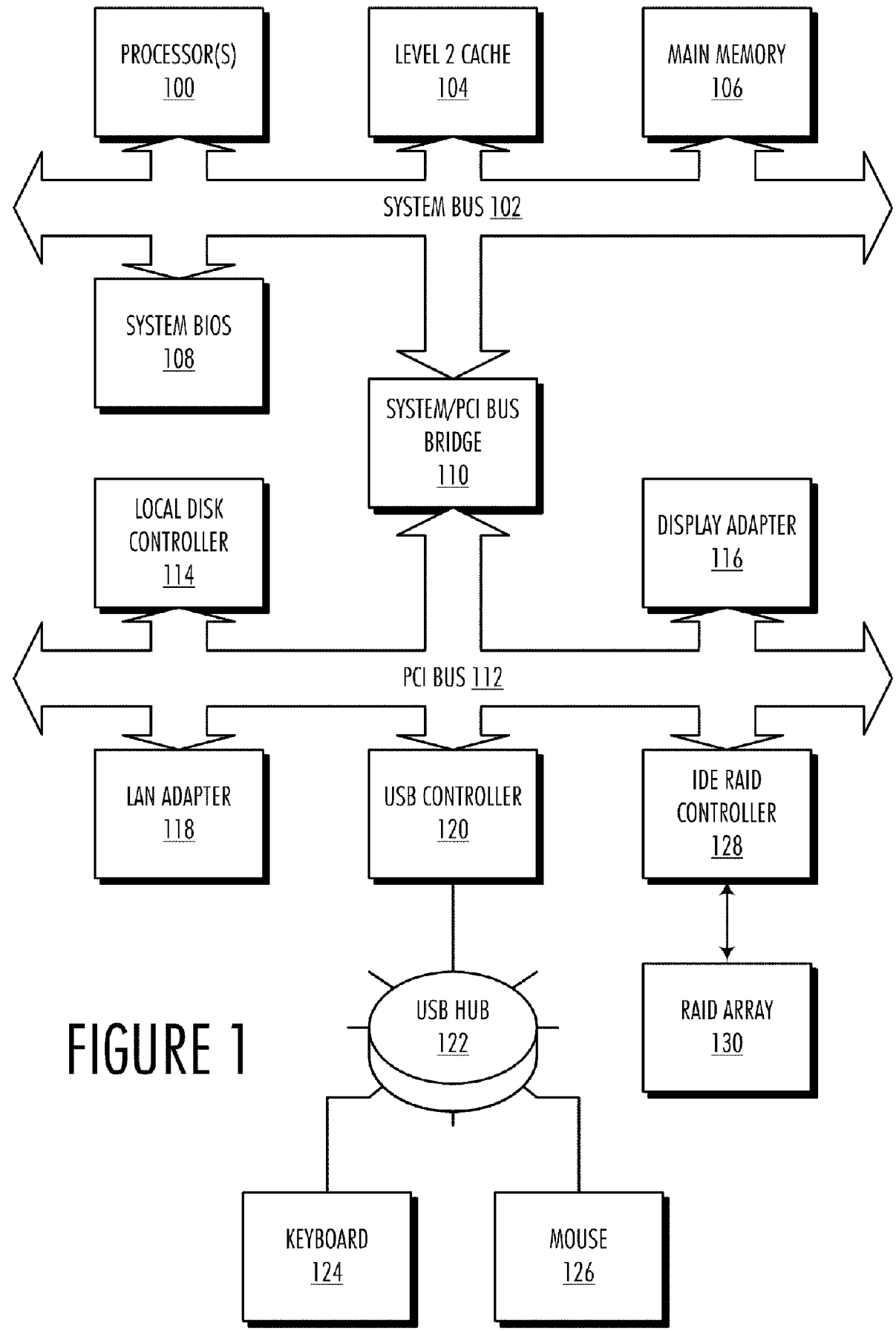
FIG. 1 is a block diagram of a computer system in which a preferred embodiment of the present invention may be implemented.

A preferred embodiment of the present invention provides an apparatus, computer program product, and method for preventing piracy in combined a software-based RAID storage system associated with a host computer system. FIG. 1 is a block diagram of a computer system in which a preferred embodiment of the present invention may be implemented.

One or more processors 100 are coupled to a system bus 102, which connects processor(s) 100 to various memory components. Main memory 106, comprising Random Access Memory (RAM), represents the bulk of primary memory storage available to processor(s) 100. A level 2 cache memory 104, which is smaller than main memory 106 but constructed using faster memory components than main memory 106, is a temporary intermediate storage area that allows processor(s) 100 to operate at a higher speed than would otherwise be possible with only main memory 106. System BIOS 108, a non-volatile memory, contains system firmware for loading an operating system at system startup and for performing various other low-level functions. BIOS is an acronym for "Basic Input/Output System." For performance purposes, it is common for processor(s) 100 to copy the contents of BIOS 108 into main memory 106 for faster access, as RAM generally allows faster access than non-volatile memories; this copying is referred to as "shadowing."

Typically, system bus 102 will follow a proprietary specification associated with processor(s) 100. While this arrangement is acceptable for interfacing processor(s) 100 to memory, because it provides for maximum performance, the proprietary nature of most microprocessor bus signal specifications seriously limits the ability of system buses like bus 102 to interface with off-the-shelf peripheral devices. For that reason, it is customary in computer design to include one or more backplane buses following a standard bus specification, to allow third-party peripheral devices to be connected to the computer system. In FIG. 1, a bus 112 following the Peripheral Component Interconnect (PCI) industry standard is provided for the connection of various peripherals. A system/PCI bus bridge 110 connects system bus 102 to PCI bus 112 and translates bus signals between the two buses.

A number of devices are shown connected to PCI bus 112. One of ordinary skill in the art will recognize that any of a great number of different kinds of devices may be connected to such a bus and that the devices described here as connected to bus 112 are intended to be merely examples. A local disk controller 114 allows data to be read or written to a locally-attached disk device such as a fixed-disk drive or a removable-disk drive. A display adapter 116 provides an interface between PCI bus 112 and a display device, such as a cathode-ray tube (CRT), liquid crystal display (LCD), or plasma display device. Local area network (LAN) adapter 118 connects PCI bus 112 to an Ethernet, 802.11 wireless network, or other form of local area network infrastructure.

Universal Serial Bus (USB) controller 120 provides an interface between PCI bus 112 and USB hub 122, to which peripheral devices conforming with the USB interface standard may be attached. USB devices are generally "hot-swappable," meaning that they may be safely added or removed from the system while the system is turned on. USB devices are typically used in applications where a removable or external device is desirable, such as in the case of human input devices. For example, in the computer system depicted in FIG. 1, USB keyboard 124 and USB mouse 126 are shown connected to USB hub 122.

As a preferred embodiment of the present invention is intended to be implemented in the context of a software-controlled RAID array, a RAID array controller card 128 is shown coupled to PCI bus 112. In this preferred embodiment, controller card 128 is a host bus adapter (HBA) that interfaces PCI bus 112 with an array of storage devices 130 (typically fixed magnetic disk drives) complying with the IDE (Integrated Drive Electronics) standard for storage device interfaces.

Figure 2:
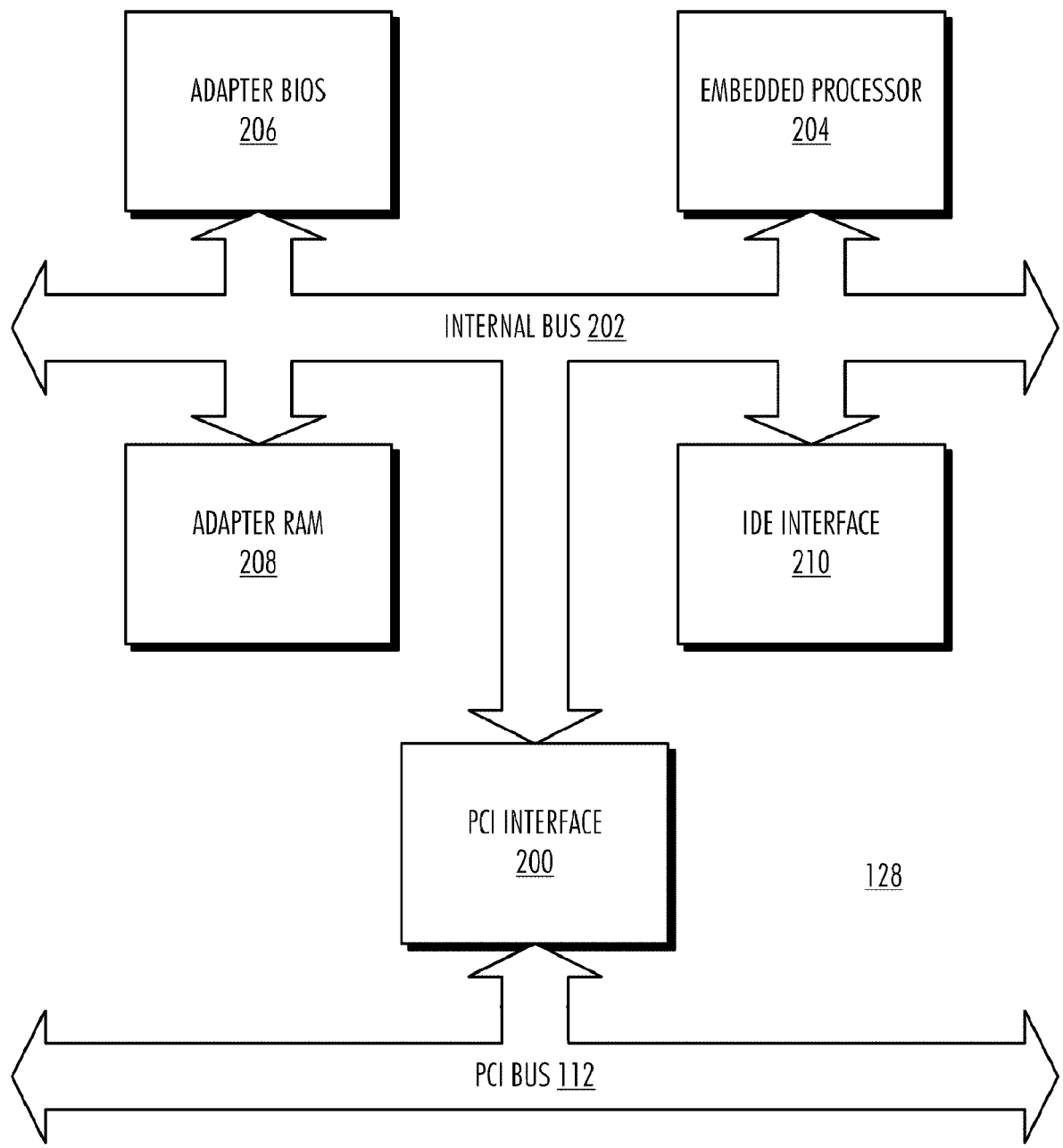
FIG. 2 is a block diagram of a storage device controller in which a preferred embodiment of the present invention may be implemented.

FIG. 2 is a diagram providing a more detailed view of the inner architecture of controller card 128 in accordance with a preferred embodiment of the present invention. One of ordinary skill in the art will recognize that many, if not all, of the components described in FIG. 2 may be embodied within a single monolithic integrated circuit (i.e., as a "system-on-a-chip," more commonly abbreviated as "SoC").

PCI interface circuitry 200 acts as a bridge between PCI bus 112 and controller 128'S internal bus 202. An embedded processor 204 is coupled to internal bus 202 and controls the operation of controller 128 according to firmware contained in adapter BIOS 206, a non-volatile memory (typically flash memory or some other electrically reprogrammable non-volatile memory). Adapter RAM 208 provides volatile storage space in the form of a plurality of scratchpad registers for storing state information. These scratchpad registers may be read from PCI bus 112 through PCI interface 200, to allow a host computer to read the state of controller 128. IDE interface 210 provides an IDE-compliant interface for communicating with the attached IDE-compliant storage devices comprising the RAID array.

A preferred embodiment of the present invention provides anti-piracy features to a software-defined RAID system. In a software-defined RAID system, all of the logic required to implement the particular RAID storage scheme or RAID level desired is provided by software that executes on the host computer system. As a consequence, in such a system, host software has full access to the controller hardware, including internal registers (adapter RAM 208), which form a part of controller 128's PCI configuration space. Because of this level of control, these registers can be used as a means of communication between different software components.

In a preferred embodiment of the present invention, a designated 32-bit register in adapter RAM 208 is used to store a signature that denotes the level of features available to the host. Firmware contained in adapter BIOS 206 is responsible for filling this register with an appropriate signature upon initialization of controller 128 (as described in FIG. 6 and accompanying text). In this preferred embodiment, a device driver for controller 128 will be loaded by the host only if one of these signatures is found. An application can access this signature by sending a low-level I/O request to the driver (such as an "ioctl( )" request in a POSIX-compliant operating system. POSIX stands for "Portable Operating System" and is a standard for UNIX-like operating systems promulgated by the Institute of Electrical and Electronics Engineers, IEEE). A user may only access features that are authorized by the feature level denoted by the stored signature. If user is willing to upgrade the features, an upgrade installer can be used to install new firmware in adapter BIOS 206.

Figure 3:
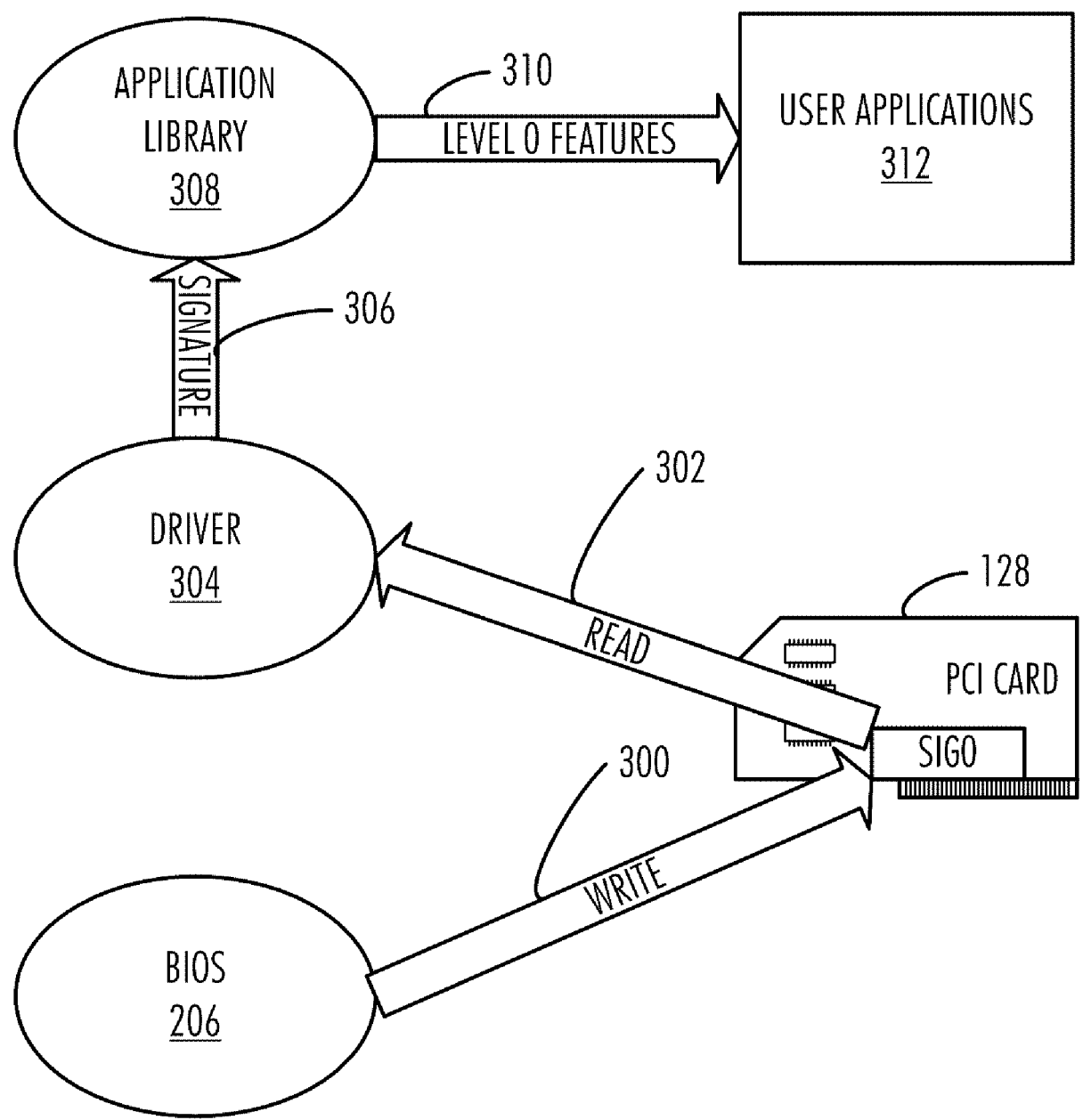
FIG. 3 is a diagram depicting operation of a preferred embodiment of the present invention when a lower feature level is authorized.

FIG. 3 shows the operation of a preferred embodiment of the present invention when a lower feature level is authorized. Adapter BIOS 206 writes (arrow 300) a signature "SIG0" (denoting a lower feature level) to a scratchpad register on controller card 128. When an application (e.g., user applications 312) wishes to make use of controller 128, this signature is read (arrow 302) by device driver 304 and passed (arrow 306) to application library 308, which provides an interface for user applications 312 to use to access controller 128. Since the retrieved signature is "SIG0," application library 308 is only allowed to provide "level 0" features (arrow 310) to user applications 312.

Figure 4:
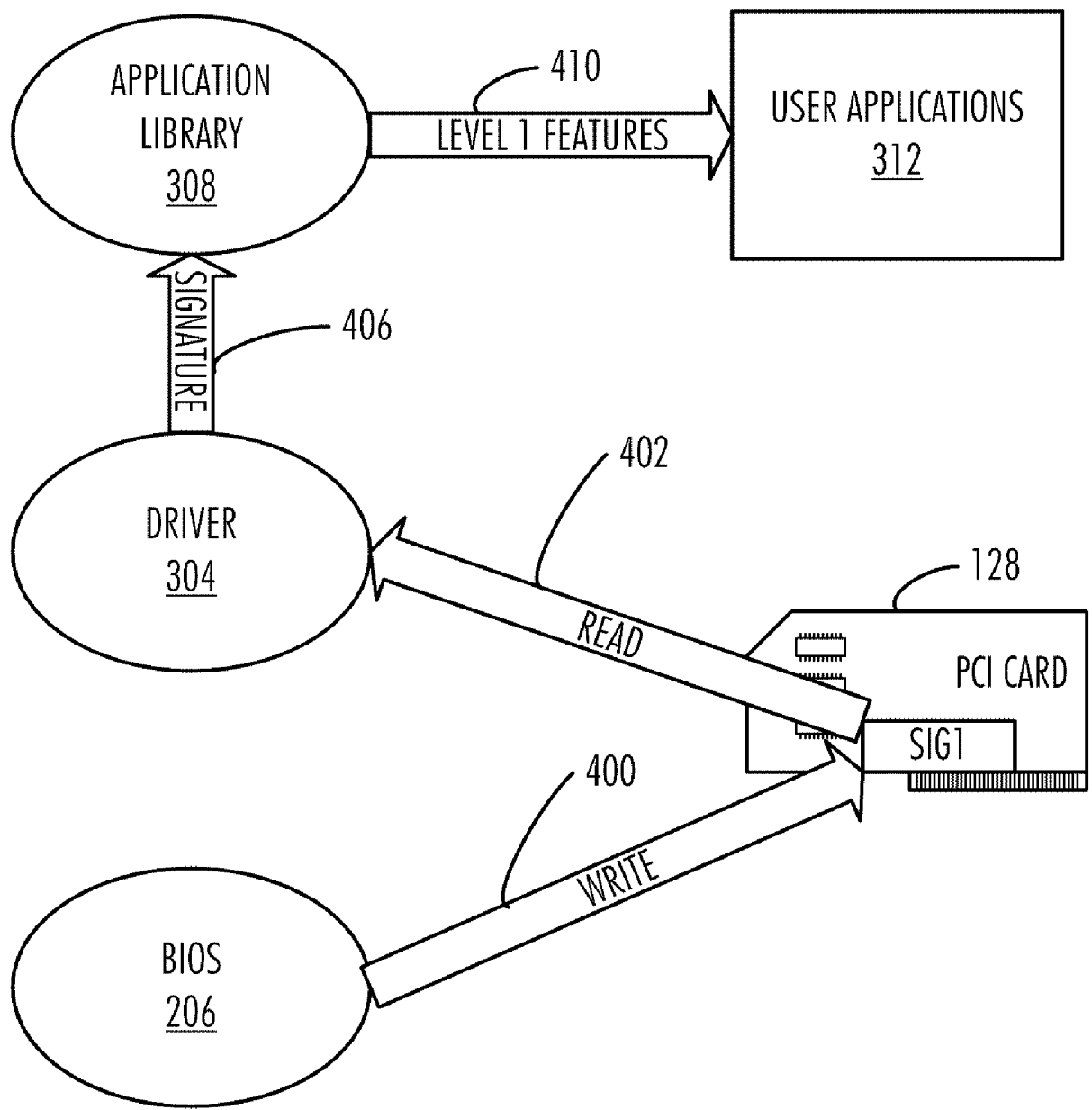
FIG. 4 is a diagram depicting operation of a preferred embodiment of the present invention when a higher feature level is authorized.

FIG. 4 shows the operation of a preferred embodiment of the present invention when a higher feature level is authorized. Adapter BIOS 206 writes (arrow 400) a signature "SIG1" (denoting a higher feature level than "SIG0") to a scratchpad register on controller card 128. When an application (e.g., user applications 312) wishes to make use of controller 128, this signature is read (arrow 402) by device driver 304 and passed (arrow 406) to application library 308, which provides an interface for user applications 312 to use to access controller 128. Since the retrieved signature is "SIG1," application library 308 is allowed to provide "level 1" features (arrow 410), a superset of the aforementioned "level 0" features, to user applications 312.

Figure 5:
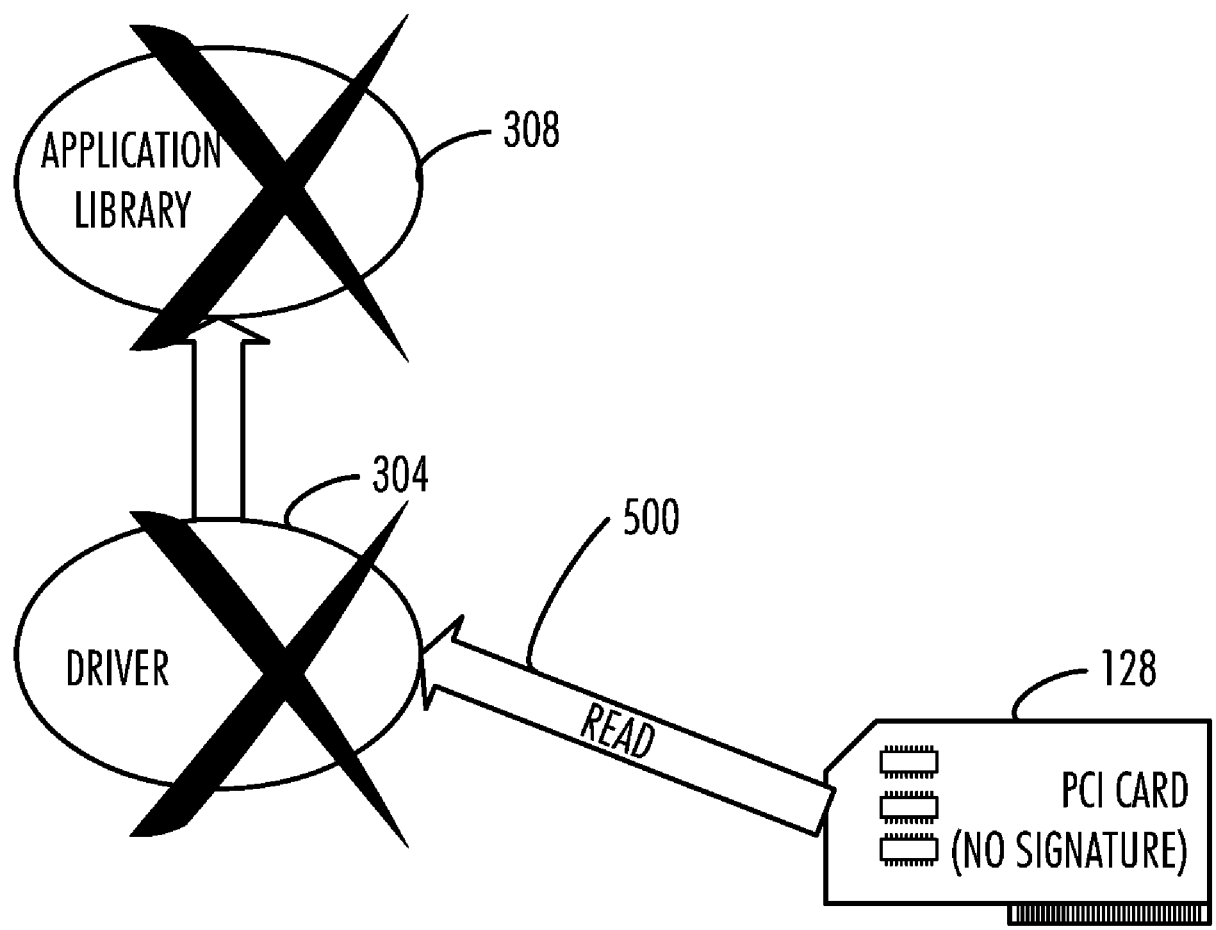
FIG. 5 is a diagram depicting operation of a preferred embodiment of the present invention when no signature is written to the controller card.

FIG. 5 depicts the situation where no signature has been written to controller card 128. This may occur, for example, in the event that controller card 128 comes from an unauthorized source (i.e., that controller card 128 is a "knock-off"). Reading the designated scratchpad register (arrow 500) reveals that neither signature ("SIG0" or "SIG1") has been written to the scratchpad register. In this case, neither device driver 304 nor application library 308, which calls device driver 304, will operate. In a preferred embodiment, device driver 304 actually checks the scratchpad register when device driver 304 is first loaded and refuses to continue loading/installing itself in response to determining that no signature has been written to the designated scratchpad register in controller 128.

Figure 6:
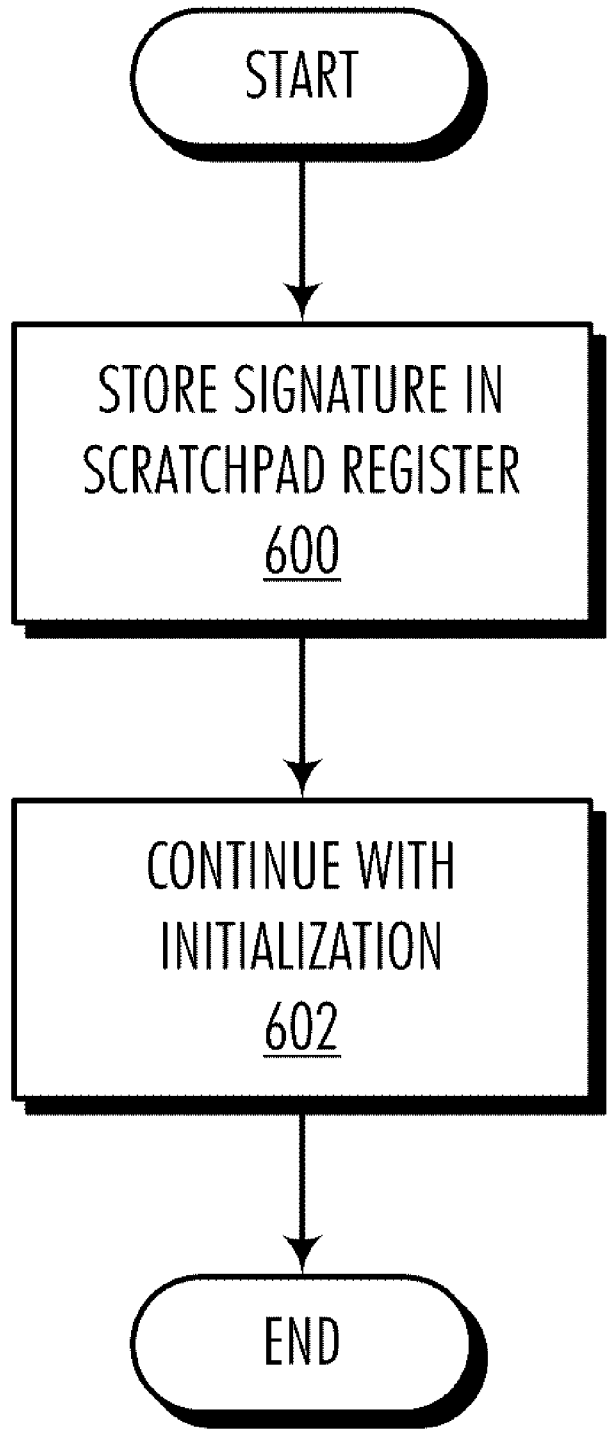
FIG. 6 is a flowchart representation of a process followed by the controller card during device initialization in accordance with a preferred embodiment of the present invention.

FIG. 6 is a flowchart representation of a process followed by controller 128 when controller 128 is initialized. Specifically (with reference to FIG. 2) embedded processor 204 follows the process depicted in FIG. 6 in accordance with program code contained in adapter BIOS 206. Returning now to FIG. 6, embedded processor 204 stores a signature, representing the user's authorized feature level, in a designated scratchpad register (block 600). Initialization of controller 128 then continues as normal (block 602).

Figure 7:
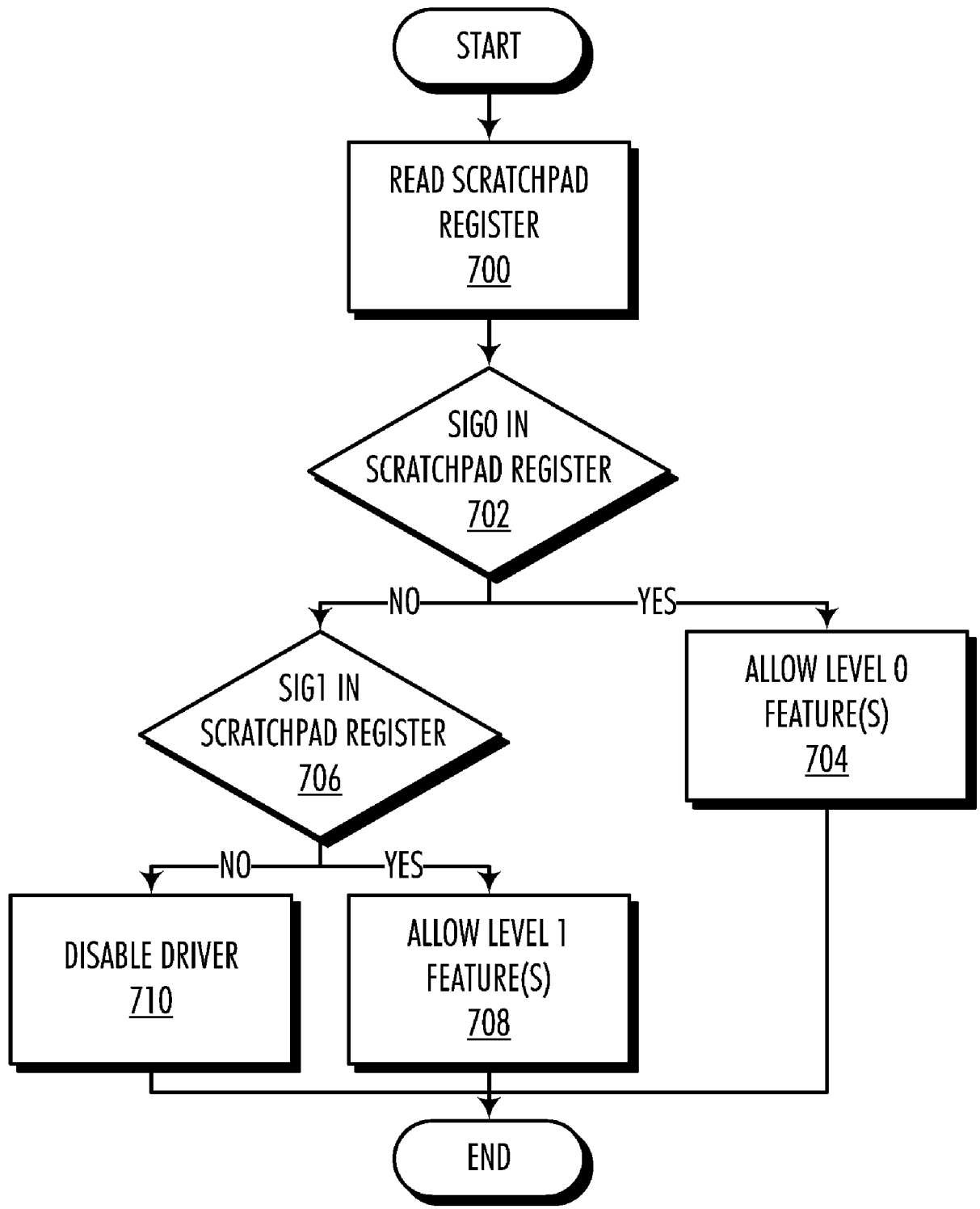
FIG. 7 is a flowchart representation of a process followed by device driver code in accordance with a preferred embodiment of the present invention.

FIG. 7 is a flowchart representation of a process followed by host computer software (executed by processor(s) 100 in FIG. 1) in conjunction with determining which features a user is authorized to use. In a preferred embodiment, this process would be executed by device driver software and/or application library code. First, the designated scratchpad register on the controller card is read (block 700). Next, if the signature "SIG0" is present in the scratchpad register (block 702:Yes), those features that are considered to be "level 0" features are authorized (block 704). Otherwise (block 702:No), if the signature "SIG1" is present in the scratchpad register (block 706:Yes), then "level 1" features are authorized. Otherwise (block 706:No), the device driver for the controller is disabled (block 710).

One of ordinary skill in the art will recognize that although only two feature levels have been depicted here, any number of different feature levels may be provided using this general approach. Moreover, although a preferred embodiment of the present invention has been shown to operate in the context of a software-defined RAID system, one of ordinary skill in the art will recognize that the teachings of the present invention may be applied to a wide variety of different hardware/software products, including those outside of the storage system field.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A computer system comprising:
   a bus system;
   a device controller connected to the bus system, wherein the device controller includes an embedded processor and a scratchpad memory, and wherein the scratchpad memory is readable via the bus system; and at least one central processor connected to the bus system, wherein upon initialization of the device controller, the embedded processor stores a signature in the scratchpad memory, wherein the signature identifies a set of product features authorized for use with the device controller, and wherein the at least one central processor receives the signature from the scratchpad memory via the bus system and directs the device controller to perform a particular action only if the action is a product feature identified as authorized by the signature.

2. The computer system of claim 1, wherein the device controller controls an array of storage devices.

3. The computer system of claim 2, wherein the array of storage devices is a redundant array of independent disks (RAID).

4. The computer system of claim 1, wherein the at least one central processor executes a device driver to control the device controller and in response to reading the signature the at least one central processor disables device driver functions not identified as authorized by the signature.

5. The computer system of claim 1, wherein the embedded processor executes internal firmware of the device controller to store the signature in the scratchpad memory.

6. A peripheral device for use in conjunction with a computer system, the peripheral device comprising:

a device interface for communicating with the computer system;

a scratchpad register; and initialization hardware, wherein the initialization hardware, during initialization of the peripheral device, communicates to the computer system, through the scratchpad register, a signature identifying an authorized subset of operations associated with a device driver executing on the computer system, wherein the device driver is adapted to perform only those operations identified as authorized by the subset.

7. The peripheral device of claim 6, wherein the peripheral device forms a device controller card connected to the computer system through the device interface.

8. The peripheral device of claim 7, wherein the device controller card controls an array of storage devices.

9. The peripheral device of claim 6, wherein the initialization hardware includes an embedded processor resident within the peripheral device, wherein the embedded processor stores the signature in the scratchpad register.

10. The peripheral device of claim 6, wherein the scratchpad register is contained within random-access memory resident within the peripheral device.

11. The peripheral device of claim 6, wherein the device interface is a bus interface adapted to communicate through a bus of the computer system.

12. The peripheral device of claim 6, wherein the scratchpad register is adapted to be read by the device driver.

13. The peripheral device of claim 12, wherein the device driver executes externally with respect to the peripheral device.

14. A method of controlling a peripheral device connected to a computer system, comprising:

initializing the peripheral device, wherein during said initializing, an initialization hardware of the peripheral device communicates a signature to the computer system, wherein the signature identifies an authorized subset of device driver features corresponding to a device driver executed by the computer system;

receiving, by the computer system, the signature from the peripheral device;

in response to receiving the signature from the peripheral device, enabling, by the computer system, device driver functions corresponding to the authorized subset while disabling those device driver functions not authorized by the received signature.

15. The method of claim 14, wherein the peripheral device communicates the signature to the computer system via a scratchpad register resident on the peripheral device and accessible to the computer system.

16. The method of claim 15, wherein the hardware of the peripheral device includes an embedded processor and the embedded processor communicates the signature to the computer system via the scratchpad register.

17. The method of claim 14, wherein the peripheral device controls an array of storage devices and the peripheral device.

18. The method of claim 16, wherein the peripheral device's control of the array of storage devices is directed by the device driver.

19. The method of claim 14, wherein the device driver is executed by a processor within the computer system, and wherein the processor is external to the peripheral device.

20. The method of claim 14, wherein the peripheral device is a device controller card.

21. The method of claim 14, wherein the signature is determined by firmware contained within with the peripheral device.

* * * * *